United States Patent Office 3,723,332
Patented Mar. 27, 1973

3,723,332
STABILIZED PERCHLOROFLUOROCARBON COMPOSITIONS
Oliver A. Barton, Florham Park, N.J., assignor to Allied Chemical Corporation, New York, N.Y.
No Drawing. Filed Nov. 27, 1970, Ser. No. 93,395
Int. Cl. C09d 9/00; C11d 7/52; C23g 5/02
U.S. Cl. 252—171                          11 Claims

ABSTRACT OF THE DISCLOSURE

Compositions comprising a perchlorofluorocarbon are stabilized against reaction with lower molecular weight alcohols at elevated temperatures by presence therein of a synergistic stabilizing mixture of a mononitroalkane and an epoxy resin. Said compositions including a lower molecular weight alcohol are useful as solvent media for metal cleaning and dry cleaning of textiles.

BACKGROUND OF THE INVENTION

Mixtures of chlorofluorocarbons and lower molecular weight alcohols have been used in the cleaning or degreasing of metal parts. In this application, the metal parts may be cleaned by dipping them into a hot solution of the cleaning solvent. When the metal parts are removed from the cleaning solvent, the solvent adhering thereto is removed by evaporation.

It is known also that chlorofluorocarbons react with alcohols on standing even in the dark with the formation of halogen acids which are corrosive to many metals. The rate of this decomposition and the formation of halogen acids is increased at elevated temperatures, such as those normally used in the solvent cleaning baths.

As shown by Kvalnes, U.S. Pat. 3,085,116, nitroalkanes are effective as inhibitors of the reaction between certain chlorofluorocarbons and primary and secondary alcohols for periods of at least six months under ordinary storage conditions, i.e. storage at ambient temperature and in the dark. However, when such compositions are subjected to the more drastic conditions usually encountered in solvent cleaning baths where the solvent mixture may be maintained for several days at or near its boiling temperature, the inhibiting action of the nitroalkane diminishes and the decomposition of the chlorofluorocarbon occurs with the production of halogen acids.

In U.S. Pat. 3,445,527, it is disclosed that certain chlorofluoroalkanes are stabilized against reaction with 85 to 95 volume percent alcohols of one to four carbon atoms by means of 0.1 to 5.0 weight percent of one or more monoepoxyethane compounds of the group epoxyethane, 2-methyl-1,2-epoxyethane, 2-vinyl-1,2-epoxyethane, and 2-methyl-2-vinyl-1,2-epoxyethane. It is also disclosed that these compositions may contain from 0.01 to 0.1 weight percent of nitromethane as an added stabilizer. The epoxymethane and nitromethane stabilized compositions of this patent, however, are subject to composition changes when used in open baths.

It is therefore an object of this invention to devise improved means for inhibiting the reactions between chlorofluorocarbons and lower molecular weight alcohols.

A particular object is to devise means for stabilizing hot mixtures of chlorofluorocarbons and lower molecular weight alcohols.

Another object is to provide new compositions of chlorofluorocarbons which do not decompose in the presence of lower molecular weight alcohols when maintained at or near the boiling point of the compositions for prolonged periods, and which are not subject to substantial composition changes when used in open baths.

Other objects of the invention will become obvious from the following description.

SUMMARY OF THE INVENTION

The above objects of the invention can be accomplished by incorporating in compositions comprising a perchlorofluorocarbon of from 1 to 3 carbons a lower molecular weight alcohol and a stabilizing amount of a mixture of mononitroalkane and an epoxy resin. The term "perchlorofluorocarbon" is meant to denote a perhalocarbon compound containing at least one chlorine and at least one fluorine atom.

The surprising discovery has been made that mixtures of a mononitroalkane and an epoxy resin impart to solvent mixtures comprising at least one perchlorofluorocarbon and a lower molecular weight alcohol, greater resistance to decomposition at temperatures above about 50° C. for longer periods than is achieved by using a stabilizer either a mononitroalkane or an epoxy resin alone. Further, these compositions are not subject to substantial composition changes when used in open baths.

The unusual stabilizing properties of mixtures of mononitroalkanes and epoxy resins is apparently due to a synergistic action between these components.

DETAILED DESCRIPTION OF THE INVENTION AND OF PREFERRED EMBODIMENTS

The present invention is of value and importance in connection with the use of perchlorofluorocarbons containing from 1 to 3 carbon atoms and particularly perchlorofluoroethanes such as 1,1,2-trichloro-1,2,2-trifluoroethane and 1,1,2,2-tetrachloro - 1,1,2 - difluoroethane. These compounds are used commercially in admixture with lower molecular weight alcohols, particularly isopropanol, in the formulation of solvent mixtures for metal cleaning baths, for dry cleaning baths for textiles and for cleaning printed electrical circuit boards.

The lower molecular weight alcohols used with the perchlorofluorocarbons mixtures of this invention contain from one to five carbon atoms. They are essentially anhydrous, that is they contain less than five and usually less than one percent by weight of water. Typical of such lower molecular weight alcohols are the following alkanols

| | |
|---|---|
| methanol | sec.-butanol |
| ethanol | tertiary butanol |
| n-propanol | n-amyl alcohol |
| iso-propanol | 2-pentanol |
| n-butanol | |

Mixtures of alcohols can be used also.

The amount of alcohol used may vary over a considerable range. Generally, the alcohol may constitute from about 5% to 40% by weight of the solvent cleaning compositions, but may constitute a higher or lower weight percentage in a given case.

The mononitroalkane used in the present invention are known compounds and may contain from 1 to 3 carbon atoms. Typical of these compounds are the following

| | |
|---|---|
| nitromethane | 1-nitropropane |
| nitroethane | 2-nitropropane |

Mixtures of these mononitroalkanes are contemplated also.

The epoxy resins used in accordance with this invention comprise a well known family of organic compounds many of which are readily available as articles of commerce. Such compounds have been defined as any molecule containing more than one epoxy group (that is a 1,2-epoxy, or vicinal epoxy group) whether situated internally, externally, or on cyclic structures, capable of being converted to a useful thermoset form.

Epoxy resins, their preparation and uses have been described in the patent and technical literature. "The Handbook of Epoxy Resins" by Lee and Neville, published in 1967 by McGraw-Hill, is considered to be an authoritative text on this subject.

Typical examples of the epoxy resins suitable for use according to the invention include the following o-(2,3-epoxy-propyl)phenyl-2,3-epoxy-propyl ether
1,3-bis(2,3-epoxy-propoxy)benzene
tris-2,4,6-(2,3-epoxy-propyl)-methyl-phloroglucinol
2,2-bis p-(2,3-epoxy-propoxy)phenyl-propane
2,2-bis(p-2,3-epoxy-propoxy-phenyl)-1,1,1,3,3,3,hexafluoropropane
4,4-bis(2,3-epoxy-propyl)phenyl ether
2,3-epoxy propyl-4,4-bis p-(2,3-epoxy-propoxy)phenyl pentanoate
2,4,4'-tris(2,3-epoxy-propoxy)-biphenyl
2,2',4,4'-tetrakis(2,3-epoxy propoxy)-benzophenone
1,1,3-tris p-(2,3-epoxy-propoxy)phenyl-propane
poly phenol formaldehyde poly(2,3-epoxy-propyl)ether
1,2-bis(2,3-epoxy-2-methyl propoxy)ethane
1,3-bis(2,3-epoxy-propoxy)propyl tetramethyl-disiloxane
polypropyl glycol di(2,3-epoxy-propyl)-ether
5,6-bis(2,3-epoxy-propoxymethyl)-1,2,3,4,7,7 hexachloro-2-norborane
2,2,-bis 4-(2,3-epoxy-propoxy)-cyclohexyl propane
bis(3,4-epoxy-6-methylcyclohexylmethyl)-adipate
di-2,3-epoxy-propyl phthalate
di-2,3-epoxy-propyl hexahydrophthalate
di-2,3-epoxy-propyl tetrahydrophthalate
di-2,3-epoxy-propyl succinate
epoxidized soya bean oil
epoxidized lanolin
diglycidyl ester of linoleic dimer acid
polyphenol formaldehyde poly(2,3-epoxy-propyl)ether
poly-o-cresol formaldehyde poly(2,3-epoxy-propyl)ether The preferred epoxy resins are those which are glycidyl ethers of bisphenols, such as the diglycidyl ether of bisphenol A, glycidyl ethers of phenol-formaldehyde novalacs, such as polyphenol-formaldehyde poly (2,3-epoxy-propyl)ether, and glycidyl esters of poly carboxylic acids such as di-2,3-epoxy-propyl phthalate.

The epoxy resins may vary from thin liquids to solids. Preferably the epoxy resins are liquids of viscosity within the range of about 2000 to about 20,000 centipoises at 25° C., having an epoxy equivalent weight within the range of about 125 to about 350, and are soluble in the chlorofluorocarbon compositions being stabilized.

Especially preferred because of its general effectiveness and ready availability, is the epoxy resin, Epon 820 (a product of Shell Chemical Company). This epoxy resin is the diglycidyl ether of bisphenol A, diluted with 2 to 5% by weight of phenyl glycidyl ether and has an epoxy equivalent weight of 180 to 195, and a viscosity within the range of 4000 and 10,000 centipoises at 25° C. The diglycidyl ether of bisphenol A is the reaction product of three moles of epichlorohydrin and two moles of bisphenol A. The undiluted resin is available under the trade designation of Epon 828 and has an epoxy equivalent weight of 185 to 192 and a viscosity of 10,000 to 16,000 centipoises at 25° C. Aralidite 6010 (Ciba) is an equivalent commercially available product.

The amount of stabilization mixture required will vary with the alcohol content of the chlorofluorocarbon/alcohol mixture and also with the temperature at which said mixture is utilized. It will be readily apparent that as the alcohol content of the mixture increases the stability of the mixture, especially at elevated temperatures, will decrease, and the rate of the decomposition reaction will increase. Accordingly, the higher the alcohol content of the mixture, the greater will be the amount of the stabilizer which should be used to provide effective protection against decomposition.

The novel compositions of this invention comprises a perchlorofluorocarbon and from about 7 to about 20 weight percent of a mononitroalkane containing from 1 to 3 carbon atoms and from about 0.4 to about 1.0 weight percent of an epoxy resin. Preferably, about 10 to about 18 weight percent of mononitroalkane in admixture with about 0.7 to 0.9 weight percent of the epoxy resin can be used and, in fact, when used will generally provide greater stability to the solvent composition, but larger amounts may be wasteful and especially with regard to the epoxy resin, which is relatively non-volatile, may leave residues or films on the metal parts or textile material being cleaned. Further, since the perchlorofluorocarbons vary with respect to their stability in the presence of lower molecular weight alcohols, it will be apparent to those skilled in this art, that the amount of the mixture of mononitroalkane and epoxy resin required to effectively stabilize a given perchlorofluorocarbon in the presence of a given lower molecular weight alcohol will vary accordingly to several factors, including the relative stability of the perchlorofluorocarbon, the amount of alcohol, and the temperature at which the composition is to be used.

The following examples will serve to illustrate the present invention. Parts and percentages are by weight and temperatures are given in degrees centigrade unless otherwise specified.

EXAMPLES 1–6

To demonstrate the surprising stabilized character of the stabilized mixtures of the invention the following series of tests were carried out.

Cold rolled steel rods, 4¼″ x ⅜″, were cleaned with steel wool and washed with acetone. Each rod, after cleaning, was weighed and then placed in a standard taper 11″ x 1″ tube. About 40 ml. of the solvent mixture being tested was placed in the tube to cover about ¾ of the rod. The tube was capped with a reflux condenser and then immersed to above the liquid level in a silicone oil heating bath. The oil was heated sufficiently to cause the test solvent to reflux. The solvent mixtures were maintained at reflux temperature for various periods, after which the solvent mixture was analyzed for chloride ion content and the weight loss of the steel rod, if any, was determined.

The data obtained in this series of tests are shown in the following table.

TABLE

| Solvent mixture [a] | 3 days | | 10 days | | 20 days | | 30 days | |
|---|---|---|---|---|---|---|---|---|
| | Cl[b] | Weight loss[c] | Cl[b] | Weight loss[c] | Cl[b] | Weight loss | Cl[b] | Weight loss |
| Example 1, Genetron® 112[d], 67 parts; Isopropanol, 22.2 parts | N.T. | 0.038 | | | | | | 5 |
| Example 2, Genetron® 112[d], 67 parts; Isopropanol, 22.2 parts; Nitromethane, 10.8 parts | 23 | | 68 | 0.0028 | 564 | 0.0233 | N.T. | .3592 |
| Example 3, Genetron® 112[d], 67 parts; Isopropanol, 22.2 parts; Epon 820, 1 part | (Bar degraded so badly after 2 days, Cl⁻ could not be determined) | | | | | | | |
| Example 4, Genetron® 112[d], 67 parts; Isopropanol, 22.2 parts; Nitromethane, 10.8 parts; Epon 820, 0.5 part | | | | | | | 4.8 | .0006 |
| Example 5, Genetron® 112[d], 67 parts; Isopropanol, 22.2 parts; Nitromethane, 7.5 parts; Epon 820, 0.5 part | | | | | | | 510 | .3011 |

[a] Reflux temperature of all solvent mixtures was about 74°. All compositions contained less than 0.1® water.
[b] Cl ion expressed in parts per million.
[c] Weight loss expressed in grams.
[d] Genetron® is the registered trademark of Allied Chemical Corporation for halogenated hydrocarbons. Genetron% 112 is 1,1,2,2-tetrachloro-1,2-difluoroethane.

NOTE.—N.T.=Indicates that the chloride ion content was so high as to make determination impractical.

These results indicate that a typical solvent mixture (Ex. 1) decomposes quite badly in 3 days at its reflux temperature; that nitromethane (16.1% based on chlorofluorocarbon) provides only limited stability for 10 to 20 days at elevated temperatures (Ex. 2), and that an epoxy resin (about 1.5% based on chlorofluorocarbon) was without effect in stabilizing the boiling mixture of perchlorofluoroethane and alcohol after two days (Ex. 3). The mixture of nitromethane (16.1% based on chlorofluorocarbon) and an epoxy resin (about 0.75% based on chlorofluorocarbon) effectively stabilizes the same solvent mixture for more than 30 days at this elevated temperature (Ex. 4).

Further, examples 2, 3, and 4 establish the presence of a synergistic effect in the mixture of mononitroalkane and epoxy resin in stabilizing perchlorofluorocarbons in the presence of lower molecular weight alcohols at elevated temperatures.

EXAMPLE 6

The test procedure described above was repeated using a mixture of 63 parts of 1,1,2,2-tetrachloro-1,2-difluoroethane, 37 parts of tertiary butanol, 5 parts of nitromethane and 0.5 part of Epon 820 as the solvent medium and a copper rod in place of the steel rod. After twelve days in the refluxing solvent (temperature of 78°) the copper rod decreased only 2.7 mg. in weight and the chloride ion content of the solvent was only 17.2 p.p.m., indicating that the mixture of nitromethane and epoxy resin was effective to stabilize the perchlorofluorocarbon in the presence of tertiary butanol at 78°.

Repetition of this experiment but omitting the epoxy resin from the mixture, resulted, after only 4 days, in the deposition of a coating of cupric chloride on the copper rod and a gain in weight of about 0.02 gram.

I claim:

1. A composition stable in the presence of lower molecular weight alcohols having from 1 to 5 carbon atoms which composition consists essentially of a perchlorofluorocarbon of from 1 to 3 carbon atoms and a mixture of from about 7 to about 20 weight percent of a mononitroalkane having from 1 to 3 carbon atoms and from about 0.4 to about 1.0 weight percent of an epoxy resin based on the perchlorofluorocarbon said mixture being present in an amount sufficient to stabilize the perchlorofluorocarbon in the presence of the lower molecular weight alcohol at a temperature between 50° C. and the boiling temperature of said composition for a period in excess of twenty (20) days in an open bath.

2. A composition as described in claim 1 wherein the perchlorofluorocarbon is a perchlorofluoroethane.

3. A composition as described in claim 2 wherein the perchlorofluoroethane is 1,1,2,2-tetrachloro-1,2-difluoroethane.

4. A composition as described in claim 3 wherein the mononitroalkane is present in the amount of from about 10 to about 18 weight percent and the epoxy resin is present in the amount of from about 0.7 to about 0.9 weight percent.

5. A composition as described in claim 3 wherein the mononitroalkane is nitromethane.

6. A composition as described in claim 4 wherein the mononitroalkane is nitromethane.

7. A composition as described in claim 3 wherein the epoxy resin is a liquid of viscosity within the range of about 2,000 to 20,000 centipoises at 25° C., having an epoxy equivalent weight within the range of about 125 to about 350 and is soluble in the perchlorofluorocarbon mixture being stabilized.

8. A composition as described in claim 7 wherein the epoxy resin is a member of the group consisting of glycidyl ethers of bisphenols, glycidyl ethers of phenol-formaldehyde novalacs, and glycidyl esters of polycarboxylic acids.

9. A composition as described in claim 8 wherein the epoxy resin is a glycidyl ether of a bisphenol.

10. A composition as described in claim 9 wherein the epoxy resin is essentially the diglycidyl ether of bisphenol A.

11. A composition as described in claim 10 wherein the epoxy resin is the diglycidyl ether of bisphenol A diluted with about 2 to 5 percent by weight of phenyl glycidyl ether and has an epoxy equivalent weight of 180 to 195 and a viscosity within the range of 4000 to 10,000 centipoises at 25° C.

References Cited

UNITED STATES PATENTS

| | | | |
|---|---|---|---|
| 3,445,527 | 5/1969 | Okamura et al. | 252—171 |
| 3,536,766 | 10/1970 | Mogford | 260—652.5 |
| 3,539,646 | 11/1970 | Dannels et al. | 260—652.5 |
| 2,260,753 | 10/1941 | Marble et al. | 260— 47 EP |
| 3,547,881 | 12/1970 | Mueller et al. | 260—47 EP |
| 3,553,165 | 1/1971 | Kiryu | 260—47 EP |

LEON D. ROSDOL, Primary Examiner

W. E. SCHULZ, Assistant Examiner

U.S. Cl. X.R.

260—652.5